United States Patent
Briggs et al.

(10) Patent No.: US 11,514,371 B2
(45) Date of Patent: Nov. 29, 2022

(54) LOW LATENCY IMAGE PROCESSING USING BYPRODUCT DECOMPRESSED IMAGES

(71) Applicant: Woven Planet North America, Inc., Los Altos, CA (US)

(72) Inventors: Forrest Samuel Briggs, Palo Alto, CA (US); James Allen-White Hoffacker, San Carlos, CA (US); Dhruv Lamba, San Mateo, CA (US); Yi Lu, San Jose, CA (US); Phillip Sawbridge, Los Altos, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 933 days.

(21) Appl. No.: 16/298,851

(22) Filed: Mar. 11, 2019

(65) Prior Publication Data
US 2019/0287024 A1 Sep. 19, 2019

Related U.S. Application Data

(60) Provisional application No. 62/642,534, filed on Mar. 13, 2018.

(51) Int. Cl.
*G06T 5/00* (2006.01)
*G06N 20/20* (2019.01)
(Continued)

(52) U.S. Cl.
CPC .......... *G06N 20/20* (2019.01); *G05D 1/0088* (2013.01); *G06T 5/002* (2013.01); *G06T 5/003* (2013.01); *H04N 19/105* (2014.11)

(58) Field of Classification Search
CPC ........ G06N 20/20; G06N 3/08; G06N 3/0454; G06N 3/02; G06N 3/082–088; G06N 20/00; G05D 1/0088; G05D 1/0221; G05D 1/0291; G06T 5/002; G06T 5/003; G06T 2207/10021; G06T 2207/30261;
(Continued)

(56) References Cited

U.S. PATENT DOCUMENTS 10,163,227 B1 * 12/2018 Lester ............... G06T 9/002
10,176,388 B1 * 1/2019 Ghafarianzadeh ..... G06V 20/58
(Continued)

OTHER PUBLICATIONS

62611536 Drawings (Dec. 28, 2017) (Year: 2017).*
(Continued)

*Primary Examiner* — Jose L Couso
(74) *Attorney, Agent, or Firm* — Christopher G. Darrow; Darrow Mustafa PC (57) ABSTRACT

In one embodiment, a computing system may receive an uncompressed image from a camera. The computing system may generate a compressed image by performing a compression process on the uncompressed image, wherein a decompressed image may be generated as a byproduct during the compression process. The computing system may send the decompressed image to a machine-learning model that was trained using decompressed images. The computing system may generate, by the machine-learning model, an output based on the decompressed image. The computing system may provide operational instructions to a vehicle based on the output.

20 Claims, 7 Drawing Sheets

(51) Int. Cl.
*H04N 19/105* (2014.01)
*G05D 1/00* (2006.01)

(58) Field of Classification Search
CPC ......... G06T 2207/30248–30252; G06T 9/002; G06T 2207/20221; G06T 3/4046; G06T 5/50; G06T 2207/10016; G06T 2207/20084; G06T 2207/20081; H04N 19/105; H04N 2013/0081; H04N 7/181; H04N 7/188; H04N 13/239; H04N 19/85; H04N 19/136; H04N 19/44; H04N 19/463; H04N 19/80; H04N 19/167; H04N 19/20; H04N 19/42; H04N 19/48; B60K 31/00; B60R 1/00; B60T 7/12; B60T 8/171; B60T 8/17551; B60T 8/17558; B60T 8/32; B60W 2420/42; B60W 2554/00; B60W 30/16; B60W 30/08; B60W 40/02; B60W 50/082; B60W 2050/0075; B60W 2556/10; B60W 2556/52; B60Y 2200/11; B60Y 2200/12; B60Y 2200/126; B60Y 2200/13; B60Y 2200/30; B60Y 2200/40; B60Y 2200/50; B60Y 2200/90; G06V 20/41; G06V 20/44; G06V 20/56; G06V 10/82; G06V 10/454; G06V 10/40; G06V 20/00; G06V 30/194; G07C 5/0866; G07C 5/0891; G06F 2111/18; G06F 30/20; G06F 30/27; G06K 9/6232; G06K 9/6271; G06K 9/6288; G06K 9/627; G06K 9/6255; G06K 9/6228; G06K 9/6256; G06K 9/6257; G06K 9/6267
See application file for complete search history.

(56) References Cited

U.S. PATENT DOCUMENTS

| | | | | |
|---|---|---|---|---|
| 10,474,161 B2* | 11/2019 | Huang | ............... | G06T 3/40 |
| 10,652,565 B1* | 5/2020 | Zhang | ............... | H04N 19/463 |
| 10,671,082 B2* | 6/2020 | Huang | ............... | G06T 3/4046 |
| 10,701,394 B1* | 6/2020 | Caballero | ............... | G06N 3/08 |
| 2015/0339826 A1 | 11/2015 | Buibas | | |
| 2016/0275413 A1 | 9/2016 | Shi | | |
| 2016/0292589 A1* | 10/2016 | Taylor, Jr. | ............... | G06N 3/0472 |
| 2017/0102950 A1* | 4/2017 | Chamberlain | ............... | G06N 20/00 |
| 2017/0113664 A1 | 4/2017 | Nix | | |
| 2017/0185898 A1 | 6/2017 | Paul | | |
| 2017/0344888 A1* | 11/2017 | Sano | ............... | B60W 30/16 |
| 2017/0345182 A1* | 11/2017 | Sano | ............... | G06V 20/58 |
| 2018/0034912 A1 | 1/2018 | Binder | | |
| 2018/0120843 A1* | 5/2018 | Berntorp | ............... | G06V 20/56 |
| 2018/0143635 A1* | 5/2018 | Zijderveld | ............... | G08G 1/096741 |
| 2018/0181860 A1* | 6/2018 | Verbist | ............... | G06N 3/0445 |
| 2018/0189581 A1* | 7/2018 | Turcot | ............... | G06N 3/0454 |
| 2018/0322386 A1* | 11/2018 | Sridharan | ............... | G06T 15/005 |
| 2018/0330178 A1* | 11/2018 | el Kaliouby | ............... | G06K 9/627 |
| 2019/0043201 A1* | 2/2019 | Strong | ............... | G06K 9/6228 |
| 2019/0130272 A1* | 5/2019 | Yosinski | ............... | G06N 3/084 |
| 2019/0145784 A1* | 5/2019 | Ma | ............... | G06F 16/29 |
| | | | | 701/448 |
| 2019/0147250 A1* | 5/2019 | Zhang | ............... | G06K 9/6262 |
| | | | | 382/224 |
| 2019/0147253 A1* | 5/2019 | Bai | ............... | G06V 10/454 |
| | | | | 382/103 |
| 2019/0147254 A1* | 5/2019 | Bai | ............... | G06V 10/82 |
| | | | | 382/104 |
| 2019/0147255 A1* | 5/2019 | Homayounfar | ............... | G01C 21/32 |
| | | | | 701/23 |
| 2019/0147331 A1* | 5/2019 | Arditi | ............... | G06V 20/58 |
| | | | | 706/20 |
| 2019/0154872 A1* | 5/2019 | Leduc | ............... | G06N 3/08 |
| 2019/0172243 A1* | 6/2019 | Mishra | ............... | G06K 9/6256 |
| 2019/0220471 A1* | 7/2019 | Mota Toledo | ............... | G06N 7/005 |
| 2022/0116628 A1* | 4/2022 | Satavalekar | ............... | H04N 1/413 |

OTHER PUBLICATIONS

62611536 Specification (Dec. 28, 2017) (Year: 2017).*
62503485 Specification (May 9, 2017) (Year: 2017).*
62503485 Drawings (May 9, 2017) (Year: 2017).*
U.S. Appl. No. 62/538,577, filed Jul. 28, 2017 (specification) (Year: 2017).*
International Search Report and Written Opinion for International Application No. PCT/US2019/021773, dated Jun. 24, 2019.

* cited by examiner

LOW LATENCY IMAGE PROCESSING USING BYPRODUCT DECOMPRESSED IMAGES

PRIORITY

This application claims the benefit, under 35 U.S.C. § 119(e), of U.S. Provisional Patent Application No. 62/642,534, filed 13 Mar. 2018, which is incorporated herein by reference.

BACKGROUND

Machine-learning models may be applied in many technological fields such as computer vision, image processing, pattern recognition, robots, vehicles, etc. Machine-learning models trained using a particular type of training data may be used to generate inferences or predictions based on the same or similar type of input data. If the machine-learning model is used for generating inferences or predictions based on input data that is different from the data by which the machine-learning model is trained, it may cause problems. For example, a machine-learning model trained using decompressed images, which may include artifacts from the compressing and decompressing processes, may generate less reliable inferences or predictions when fed by uncompressed images which do not include the artifact in the decompressed images.

However, using traditional decompression method to generate decompressed images for feeding the machine-learning model may cause latency, which consequently causes problems for low-latency or real-time applications such as vehicle navigation. For example, a vehicle may use a machine-learning model trained using decompressed images to make decisions in response to the external environment. The machine-learning model may generate inaccurate or unreliable predictions if it is fed with uncompressed images at inference time. Generating decompressed images by traditional decompression methods may cause latency and increase the time needed by the vehicle to respond to the surrounding environment.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Machine-learning (ML) models can be applied in many technological fields including, for example, but not limited to, computer vision, image processing, pattern recognition, robots, vehicle navigation, etc. To generate accurate inferences or predictions, the data used to train a ML model and the data that is fed to the ML model at inference time is ideally the same type of data. However, this is not always possible because the massive amounts of data needed to train the ML model may need to be compressed for storage. Therefore, the ML model may usually be trained by decompressed data (based on the stored compressed data) which may include artifacts from the compressing and decompressing processes. However, the ML model may be fed with uncompressed data (e.g., raw data) at inference time during real-time operations because the compressing and then decompressing process may be too time consuming and cause too much delay for real-time applications. As an example, a vehicle may use a machine-learning model trained using decompressed images to make decisions in response to the external environment. The machine-learning model trained by decompressed data may generate inaccurate or unreliable predictions if it is fed with uncompressed images at inference time. Generating decompressed images by traditional decompression methods may cause latency and increase the time needed by the vehicle to respond to the surrounding environment.

Particular embodiments of the system provide a technical solution to these problems by generating the decompressed images as by-product during the compressing process of these images. Particular embodiments of the system improve the accuracy and reliability of the inferences or predictions of the ML model by feeding the ML model with the same type of data (e.g., decompressed images) with the type of data used for training the ML model and avoid the latency caused by the traditional decompressing process. It is notable that the vehicle applications are used as example applications in this disclosure, but the invention is not limited to the vehicle applications. Particular embodiments of the system may be applicable to many technological fields including, for example, but not limited to, computer vision, image processing, pattern recognition, robots, vehicle navigation, or any application involving ML models. It is also notable that, for vehicle applications, particular embodiments may be applicable to any vehicles including, for example, but not limited to, an autonomous vehicle, a driver-driven vehicle, a computer-assisted vehicle, a human-computer hybrid driving vehicle, etc.

In particular embodiments, a vehicle (e.g., an autonomous vehicle, a driver-driven vehicle, a computer-assisted vehicle, a human-computer hybrid driving vehicle, etc.) may include a system having a variety of modules or sub-systems for enabling the vehicle to determine its surroundings and safely navigate to target destinations. In particular embodiments, the system may include, for example, but are not limited to, a computing system, sensor arrays, cameras, LiDAR systems, RADARs, stereo vision systems, ultra sound systems, a global positioning system (GPS), inertial measurement units, accelerometers, gyroscopes, odometer systems, or other related systems. The computing system may include one or more central processing units, graphical processing units, memory, and storage for controlling various operations of the vehicle, such as driving and navigating. The sensor array may include a number of cameras organized as stereo camera pairs with overlapping field of views (FOVs). The camera may include an image sensor that is configured to capture individual photo images or a series of images as a video. The computer system may control the cameras in the sensor array to generate a video stream of the surrounding environment of the vehicle. The video stream, together with data from other sensors or modules, may be sent to the computing system for processing and analysis. The computer system may use algorithms to extract useful information from the video stream and other sensor data. The system may use a sensor fusion algorithm to construct 3D models of the surrounding environment based on the video stream and other sensor data. The computer system may process and analyze images in the video stream to make decisions for the driving and navigating operations to safely guide the vehicle.

Successful and safe navigation of a vehicle may depend on making appropriate decisions in response to the external environment at all times. The vehicle may use the machine-learning (ML) model for making predictions, inferences, or decisions in response to the surrounding environment. The ML model may also be used for various other functionalities, such as, processing images, detecting people, or classifying objects. The ML model needs to make correct predictions and respond quickly. The correctness of the predictions may depend on the quality of the underlying data being fed to the ML model and usage of the same type of data at both training time and inference time. The response speed may depend at least in part on how quickly the data can be made available to the ML model at inference time.

In particular embodiments, the ML model may be trained offline to the vehicle. For example, the vehicle may drive around while gathering and recording data in the disk. The ML model may not be trained when the data is gathered. Instead, the recorded data may be unloaded once the vehicle returns to the service center, and thereafter the data may be used by a ML training system to train the ML model.

In vehicles, the raw, high-definition video stream generated by the cameras may be very large in size, for example, GB per second or TB per hour. While it is technically possible to train a machine-learning model using raw data, doing so is impractical. The vehicle may need to store the gathered data in the on-board storage until the data can be unloaded. The on-board storage may have physical limitations in terms of carrying HD video. However, the vehicle may drive for many hours on road and the raw data being generated during that period may become too large to be stored in the on-board storage. Wireless transmission of data to the cloud is also impractical, given the rate at which the massive amounts of data is being gathered and the transmission bandwidth available. Therefore, to store such a huge amount of data in a storage with a reasonable size, the video may need to be compressed into a smaller size. The system may compress the raw video generated by the cameras and record the compressed video into the storage of the system. The recorded video in compressed format may be used for the offline training of the ML model.

Although the compressed images may be used for training the ML model, doing so is not ideal due to the quality of the compressed images. For example, the compressed images in the compressed video may have artifacts from the compression process. The artifacts may include blur or other distortion caused by the lossy compression. The noise in the compressed images, in turn, may negatively affect the accuracy of the ML model. Alternatively, the compressed video may be decompressed and fed to the ML model for training. Therefore, the training of the ML model may be based on the decompressed video. Although the quality of decompressed video is better than that of compressed video, it is still different from the uncompressed, raw video. For example, the decompressed video may have artifacts from the compression/decompression process.

At inference time (i.e., prediction time), the real-time video stream received by the computer system and fed to the ML model may be the raw video stream of the cameras. Since raw video is directly output by the cameras without processing, using raw video offers the least amount the latency. However, feeding the ML model with a raw video stream can cause technical problems such as inaccuracy and unpredictability if the ML model was trained on decompressed video. For example, when a vehicle is gathering sensor data, a key object (e.g., a car, a human, or a pet) that is relative far (e.g., 30 meters) away from the cameras may be only a few pixels tall in the raw images and, when storing the video data, the compression algorithm may blur the key object into noise. Even if the image is later decompressed, the image may still contain noise. When the ML model is trained, the ML model would learn from features detected in the images, including any blur and noise. At inference time, the raw video generated by the cameras of the vehicle in real-time may not have the blur or noise like the decompressed images. Therefore, feeding the ML model with raw video at inference time may put the ML model in situations that are different from how the ML model is trained. This may result in inaccurate or suboptimal ML predictions, which in turn may negatively impact the AV's operations.

In order to solve these problems, in particular embodiments, the ML model at inference time may be fed with decompressed images instead of the raw images. The decompressed images being fed to the ML model at inference time may have the same artifacts such as blur or noise as the images used for training, and therefore the system may be more accurate in object detection and more predictable in response to the surrounding environment. However, generating the decompressed images in a traditional way, which involves (1) compressing the raw images and subsequently (2) decompressing the compressed images, may take time, and consequently may cause latency in the vehicle's response time to the surrounding environment.

To solve this latency problem, in particular embodiments, the decompressed images may be generated as a byproduct of the encoding process of the raw video stream for recording process. The computer system may encode the raw video stream to compress the video into a smaller size for logging to the storage. During the encoding process, the decompressed images may be generated as a byproduct of the encoding process. In this way, the system may avoid the latency caused by the traditional decompressing processes and may minimize the overall latency of the whole response process of the system.

More specifically, particular embodiments of the system may include a computer, one or more camera interface devices, a number of stereo camera pairs, and other subsystems. The computer may include one or more graphic processing units (GPUs). The computer may be coupled to the one or more camera interface devices associated with the stereo camera pairs. In particular embodiments, the computer may include the trained ML model in one or more of the graphic processing units (GPUs) of the computer. In particular embodiments, the ML model may be in a cloud and the computer may be coupled to the ML model through a connection to the cloud. In particular embodiments, each camera interface device may include an image signal processing (ISP) module and a compression module. In particular embodiments, the camera interface device may receive the uncompressed video stream from the stereo camera pairs. The camera interface device may compress the received video into smaller size and send the compressed video to the storage of the computer. The recorded video in the compressed format may subsequently be used to train a ML model. For example, the recorded video may be transferred to a separate computing system when the vehicle returns to a service center or uploaded to a cloud, and thereafter the compressed video may be decompressed for training of the ML model. Once trained, the ML model may be made available to the vehicle (e.g., by downloading it onto the vehicle or made accessible via a cloud) to make real-time or near real-time predictions. In particular embodiments, at inference time, the camera interface device may generate decompressed video as a byproduct of the encoding process for compressing the video for recording purpose. Notably, the byproduct decompressed video is not generated by: (1) generating the compressed video using a compression algorithm on the raw video and (2) decompressing the compressed video in a separate process using a decompression algorithm. Rather, the decompressed video is generated as a byproduct of step (1), thereby reducing latency by avoiding the need for step (2). The byproduct decompressed video may be fed into the ML model at the inference time. The system may process and analyze the received decompressed video using the ML model to make decisions in response to the surrounding environment to safely guide and navigate the vehicle.

Particular embodiments improve the ML system of an AV in terms of both prediction accuracy/quality and speed. The ML model may have better accuracy in object detection and may have more predictable results in response to the surrounding environment. Particular embodiments achieve this improvement by decreasing the latency associated with generating decompressed video, thereby making it practical for a vehicle system with real-time demands to use decompressed video (instead of raw video, for example) at inference time. As previously explained, a ML model that was trained on decompressed images may achieve more accurate and predictable results if it also uses decompressed images at inference time, since decompressed images is what the ML model learned to process. Particular embodiments enable the use of decompressed images at inference time by reducing the latency typically associated with generating decompressed images. By using the byproduct decompressed images of the encoding process of image compression, the system may avoid the extra latency caused by the additional compressing and decompressing processes to generate the decompressed images. Therefore, using the byproduct decompressed images may minimize the latency caused by the process for generating the decompressed images and may reduce the overall time budget requirement for the whole process of the system in response to the surrounding environment. Particular embodiments of the system and method of this disclosure may be implemented on or associated with a stand-alone device. Particular embodiments of the system and method of this disclosure may be associated with or applicable to all kinds of vehicles including, for example, but not limited to, an autonomous vehicle, a driver-driven vehicle, a computer-assisted vehicle, a human-computer hybrid driving vehicle, etc.

Figure 1:
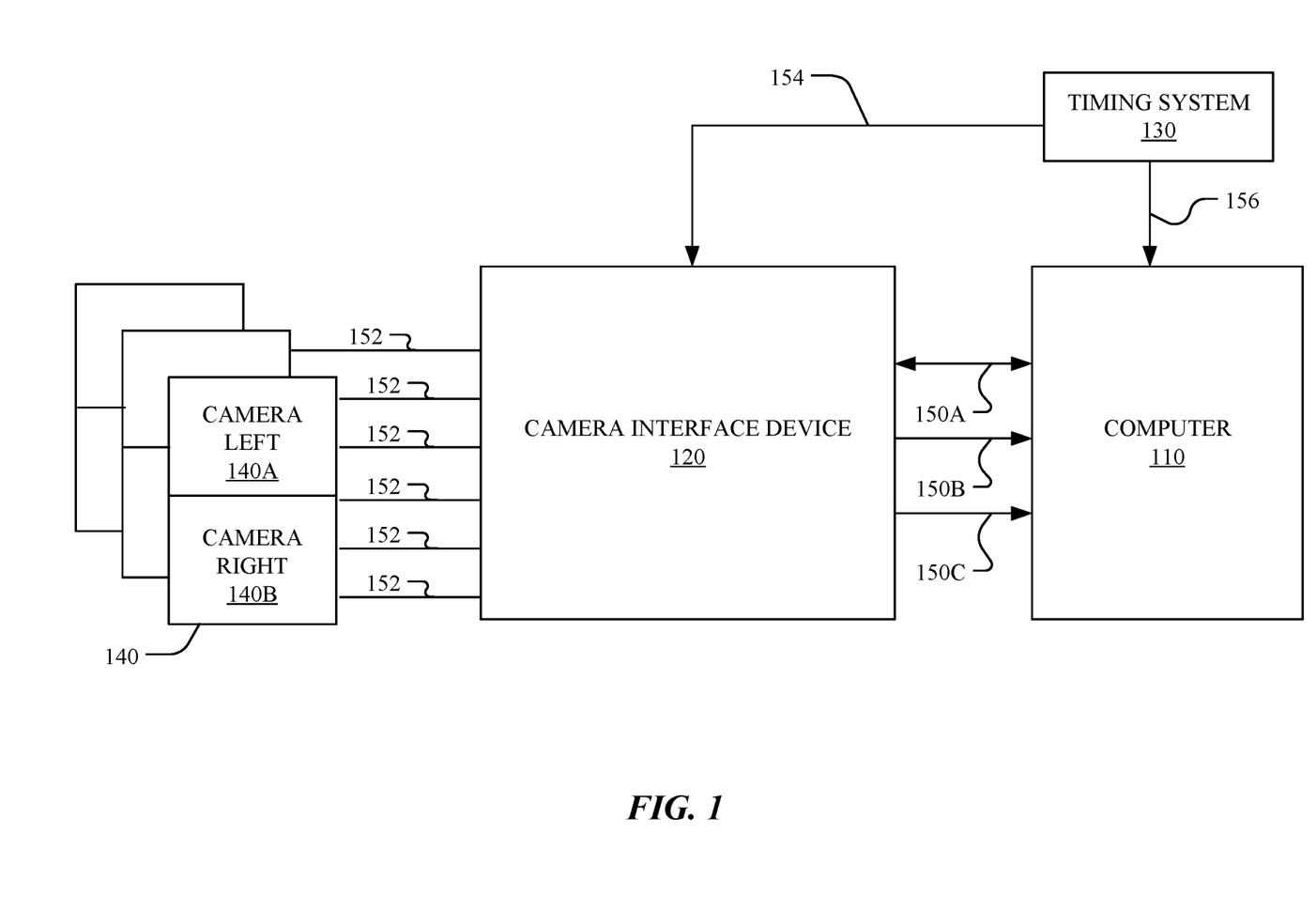
FIG. 1 illustrates an example high-level schematic of an automotive camera system.

FIG. 1 illustrates an example high-level schematic of an automotive camera system. In particular embodiments, the system may include a computer 110, one or more camera interface devices 120, a timing system 130, and a number of camera pairs 140. In particular embodiments, the camera interface device 120 may be a camera interface board (CIB). In particular embodiments, the computer 110 may be coupled to the camera interface device 120 through multiple channels including, for example, but not limited to, a gigabit ethernet (1 GigE) control plane channel 150A, a number of 10 gigabit ethernet (10 GigE) data channels 150B, or a number of PCI Express (PCIe) channels 150C. The GigE control plane channel 150A may include the control signals for image compression, i2C control, and image signal processing (ISP) of the camera interface device 120. The 10 GigE data channels 150B may use user datagram protocol (UDP) for communicating with the computer 110 and may have a bandwidth of 10 Gbps. The PCIe channels 150C may have at least 16 channels and may have a bandwidth of 126 Gbps. The timing system 130 may be coupled to the computer 110 through a timestamp link 156 and may be coupled to the camera interface device 120 through a camera synchronizing link 154. The camera interface device 120 may be coupled to the camera pairs through a number of coax serial links 152. In a particular embodiment, the coax serial links 152 may transmit power for the associated cameras and a number of signals, for example, mobile industry processor interface (MIPI) signals, synchronizing signals, I2C signals, and signals for image data. In particular embodiments, each camera pair may be a stereo camera pair including a left camera 140A and a right camera 140B. Two cameras from the same stereo camera pair or different stereo camera pairs may have an overlapping field of view (FOV). The cameras may have high dynamic range (HDR) imaging capability. In particular embodiments, two or more cameras in the camera pairs may be synchronized for timing with a high precision (e.g., less than 10 ns skew) for taking pictures for advanced 3D reconstruction. In particular embodiments, the cameras being synchronized may be within the same camera pair or from different camera pairs. In particular embodiments, some or all of the cameras of the stereo camera pairs 140 may be mounted on the roof of the vehicle. In particular embodiments, some or all of the stereo camera pairs 140 may be mounted on other parts of the vehicle, for example, on the sides of the vehicle or inside the vehicle. In particular embodiments, the camera interface devices 120 may be mounted inside the vehicle. In particular embodiments, the camera interface devices 120 may be mounted outside the vehicle, for example, on the roof of the vehicle.

In particular embodiments, the computer 110 may coordinate with the timing system 130 and the camera interface device 120 to control the camera pairs 140 to take pictures or generate a video stream composed of a series of images. In particular embodiments, the computer 110 may communicate with other sensors system for exchanging data signals and control signals through other interfaces. In particular embodiments, the timing system 130 may include a time generator generating timing signals for the system. The timing system 130 may send the timing signals to the camera interface device 120 through the camera synchronizing link 154 to synchronize multiple cameras in the camera pairs 140. The timing system may send timestamps to the computer 110 through the timestamp link 156. In particular embodiments, the timing system may communicate with other sensors through other sensor timing interfaces. The camera interface device 120 may receive the raw video stream from the camera pairs 140. The camera interface device 120 may compress the received raw video from the camera pairs 140 and send the compressed video to the computer 110 through the channels between the camera interface device 120 and the computer 110. The computer 110 may store the received compressed video in a storage (e.g., a non-volatile storage) and the stored videos in compressed format may be used for offline training of a ML model associated with the vehicle. In particular embodiments, the camera interface device 120 may generate the decompressed video as a byproduct during the encoding process for compressing the video and send the decompressed video to the computer 110 through the channels between the camera interface device 120 and the computer 110. In particular embodiments, the camera interface device may send all three of the compressed video, the decompressed video, and the uncompressed video to the computer 110 through the channels between the camera interface device 120 and the computer 110. The computer 110 may process and analyze the received decompressed video using the ML algorithm to make operative decisions for guiding the vehicle. In particular embodiments, the computer 110 may receive vehicle status data from other parts of the system and send out vehicle control commands to the vehicle. In particular embodiments, the computer 110 may be mounted inside the vehicle. Although this disclosure illustrates and describes the camera system that are configured in a particular manner, this disclosure contemplates any suitable camera system for vehicle that are configured in any suitable manner.

Figure 2:
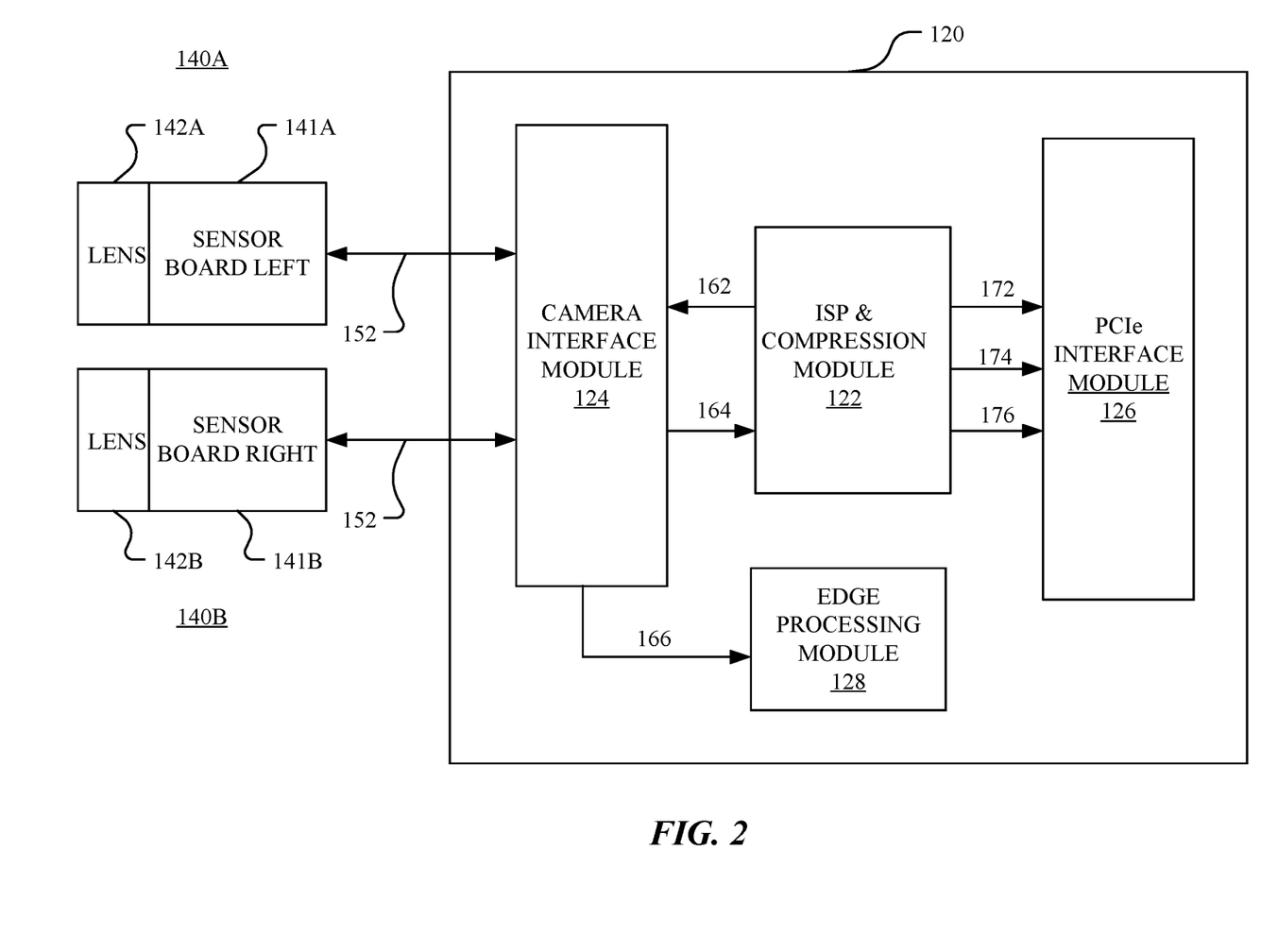
FIG. 2 illustrates an example camera interface device connecting to a stereo camera pair.

FIG. 2 illustrates an example camera interface device connecting to a stereo camera pair. In particular embodiments, the camera interface device 120 may be a camera interface board (CIB) mounted on the roof of the vehicle or inside the vehicle. In particular embodiments, the camera interface device 120 may include an image signal processing (ISP) and compression module 122, a camera interface module 124, a PCIe interface module 126, and an edge processing module 128. In particular embodiments, the ISP and compression module 122 may be coupled to the camera interface module 124 through a sensor I2C channel 162 and a MIPI channel 164. The ISP and compression module 122 may be coupled to the PCIe interface module 126 through a number of channels such as 172, 174, and 176. The camera interface module 124 may be coupled to the edge processing module 128 through the channel 166. The camera interface module 124 may be coupled to the stereo camera pair 140A 140B through the coax serial links 152. The stereo camera pair 140A 140B may include a left camera 140A and a right camera 140B. The left camera 140A may include a camera lens 142A and a left sensor board 141A for the left camera 140A. The right camera 140B may include a camera lens 142B and a right sensor board 141B for the right camera 140B. In particular embodiments, the system may include a stereo engine (not shown).

In particular embodiments, the sensor board (141A, 141B) of each camera may include a serializer and an image sensor. In particular embodiments, the image sensor may be, for example, an image sensor having HDR capability, 1920 by 1080 pixels resolution, 10 bits per pixel data, and 30 FPS frame rate. In particular embodiments, the image sensor may be a complementary metal oxide semiconductor (CMOS) sensor. In particular embodiments, the image sensor may be a monochrome sensor with RCCC or RCCB array with 4 k resolution (i.e., 4096 pixels by 2160 pixels. The sensor board (141A, 141B) may be coupled to the serializer through a number of channels, such as, a MIPI channel, a I2C channel, and a synchronizing channel. The cameras (140A, 140B) may capture a series of images forming a video stream and may send the video stream to the camera interface device 120 through the serializer and the coax serial links 152. The serializer may convert the image signals into a format suitable to be transmitted through the coax serial links 152. In particular embodiments, the camera interface module 124 of the camera interface device 120 may be a deserializer which may receive the video stream from the cameras (140A, 140B). The deserializer may convert the received serialized signals back to image signals suitable to be processed by the ISP and compression module 122 and the edge processing module 128.

In particular embodiments, the ISP and compression module 122 may be a system-on-chips (SoC) with a compressor for H.265 compression. The ISP and compression module 122 may send I2C signals to the camera interface module 124 through the sensor I2C channel 162 and may receive the uncompressed video stream from the camera interface module 124 through the MIPI channel 164. The uncompressed video stream may be the interleaved video stream of the left and right cameras (140A, 140B) of the stereo camera pair. In particular embodiments, the uncompressed video stream may have a very large data size requiring a large bandwidth for example, several GB per second. As an example and not by way of limitation, the video stream from 8×4k cameras with a frame rate of 10 fps may generate data up to 3.5 TB per hour. To store such a huge amount of data in a storage with a reasonable size, the video stream may need to be compressed into a smaller size. In particular embodiments, the ISP and compression module 122 may compress the received uncompressed video into a smaller size using the compressor of the module. The compressed video may be sent to and stored in the storage of the computer.

In particular embodiments, the ISP and compression module 122 may generate the decompressed video during the encoding process for compressing the video for recording purposes. The ISP and compression module 122 may send the compressed video, the decompressed video, and the uncompressed video to the PCIe interface module 126 through the channels 172, 174, and 176, respectively. The ISP and compression module 122 may communicate with the computer through the 1 GigE control plane. The PCIe interface module 126 may include an FPGA module as the packetization endpoint module for the PCIe interface. The PCIe interface module 126 may receive camera trigger synchronizing signals from the timing generator of the timing system 130 and send the synchronizing signals to the camera interface module 124.

The camera interface module 124 may send the interleaved video stream to the edge processing module 128 through the channel 166. The edge processing module 128 may process the received data using edge processing algorithms to extract the stereo and perception information from the interleaved video stream. In particular embodiments, the edge processing module 128 may detect or classify the objections in the images of the received video. The edge processing module 128 may communicate with the computer through a 1 GigE channel for the stereo and perception data and control information. Although this disclosure illustrates and describes the cameras and the camera interface device that are configured in a particular manner, this disclosure contemplates any suitable cameras and camera interface devices for the vehicle that are configured in any suitable manner.

Figure 3:
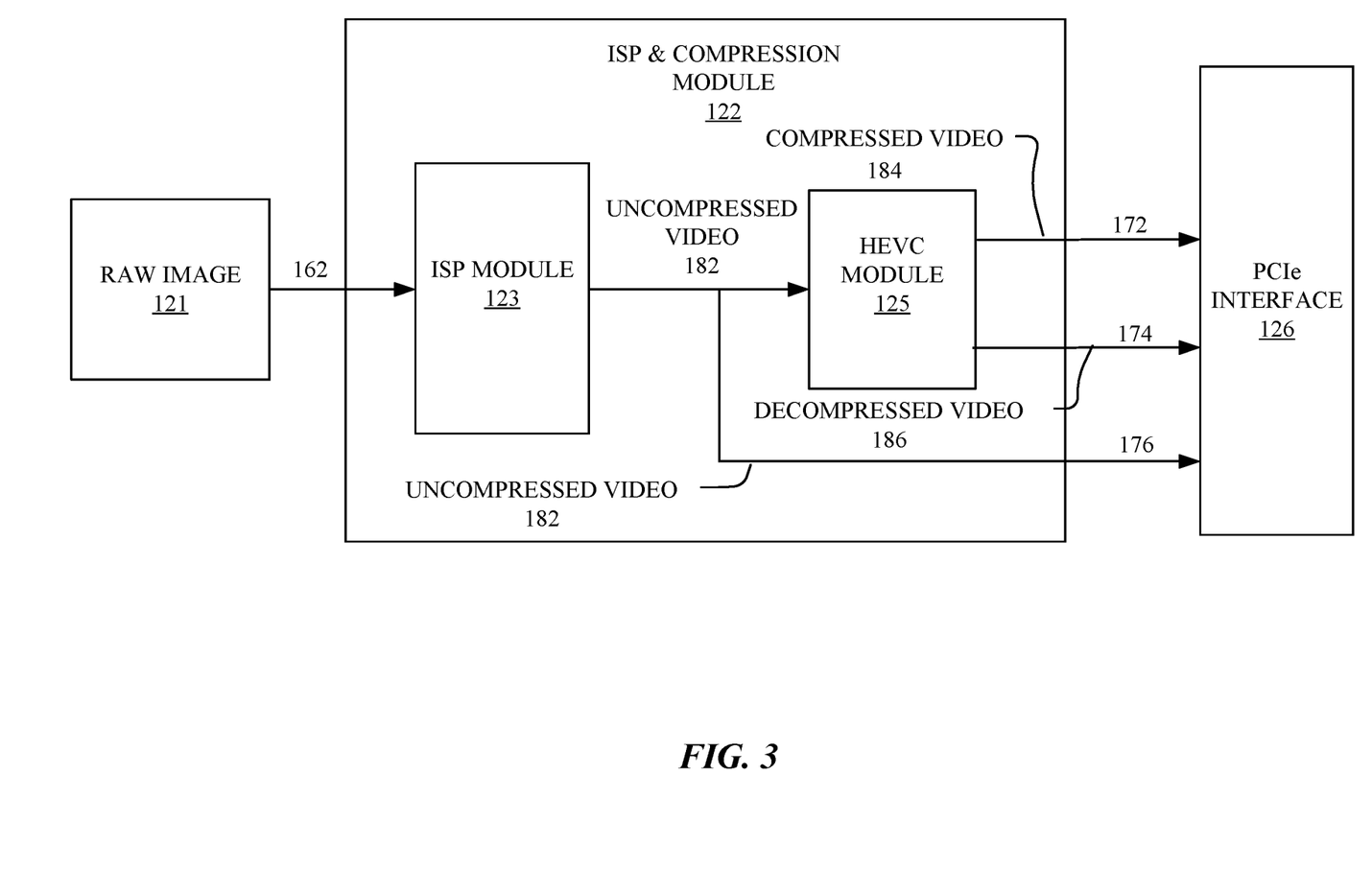
FIG. 3 illustrates an example configuration for generating byproduct decompressed images.

FIG. 3 illustrates an example configuration for generating byproduct decompressed images. In particular embodiments, the ISP and compression module 122 may receive a raw image 121 through the coax serial link 152. In particular embodiments, the raw image 121 may include a Bayer pixel array including a number of pixels for the three colors of red, green, and blue. For example, the raw image 121 may have 4096 pixels by 2160 pixels resolution and each pixel may have 10 bits for digitalized data (i.e., 10 bits per pixel). In particular embodiments, the ISP and compression module 122 may include an SoC ISP chip. In particular embodiments, the ISP and compression module 122 may include an ISP module 123 and a high efficiency video coding (HEVC, i.e., H.265) codec module 125. In particular embodiments, the ISP and compression module 122 may be based on field-programmable gate array (FPGA). In particular embodiments, the ISP and compression module 122 may be based on application-specific integrated circuit (ASIC). The ISP module 123 may process the received raw image 121 for demosaic processing (i.e., debayer processing), color correction, and color space chroma subsampling. In particular embodiments, the ISP module 123 may generate uncompressed images or video 182 (e.g., with YcrCb422 color space, 1920 pixels by 1080 pixels resolution, and 16 bits per pixel data). In particular embodiments, the HEVC codec module 125 may receive the uncompressed images or video 182 from the ISP module 123 and generate the compressed video 184 according to the H.265 compression standard. The compressed video 184 may have smaller size and need less bandwidth for transmission than the uncompressed video 182. As an example and not by way of limitation, the compressed video 184 may have a size which is one tenth to the size of the uncompressed video 182. In particular embodiments, the HEVC codec module 125 may allow the video content to have a data compression ratio up to 1000:1. In particular embodiments, the HEVC codec module 125 may generate the decompressed video 186 during the encoding process for compressing the received video. In particular embodiments, the ISP and compression module 122 may send the compressed video 184, the decompressed video 186, and the uncompressed video 182 to the PCIe interface module 126 through the channels of 172, 174, and 176, respectively. In particular embodiments, the compressed video may be sent to the computer to be logged to a disk of the computer. The compressed video may need a much smaller bandwidth than the uncompressed video. As an example and not by way of limitation, with the 10:1 compression ratio, the compressed video may have a bandwidth of 100 Mbps per camera given the image resolution of 1920 pixels by 1080 pixels and the frame rate of 30 fps.

In particular embodiments, the decompressed video may be sent to the GPUs of the computer for feeding the ML algorithms at inference time. The inferences of the ML model may include making on-board predictions and decisions based on the input data and provide operative feedback to the vehicle such as steering. The decompressed video stream may have bandwidth of 1 Gbps per camera given the image resolution of 1920 pixels by 1080 pixels and the frame rate of 30 fps. In particular embodiments, the system may generate selected uncompressed video composed of frames selected from the original raw video, for example, 1 frame out of N (e.g., 50, 100, 200) frames. The selected uncompressed video may be sent to the computer to be logged in disk. The video composed of the selected frames may have a much smaller bandwidth than the original unselected uncompressed video. As an example and not by way of limitation, the video composed of the selected frames for 1 frame out of 100 frames may have a bandwidth of 10 Mpbs per camera given the image resolution of 1920 pixels by 1080 pixels and the frame rate of 30 fps. Although this disclosure illustrates and describes the ISP and compression module that are configured in a particular manner, this disclosure contemplates any suitable ISP and compression module for vehicle that are configured in any suitable manner.

Figure 4:
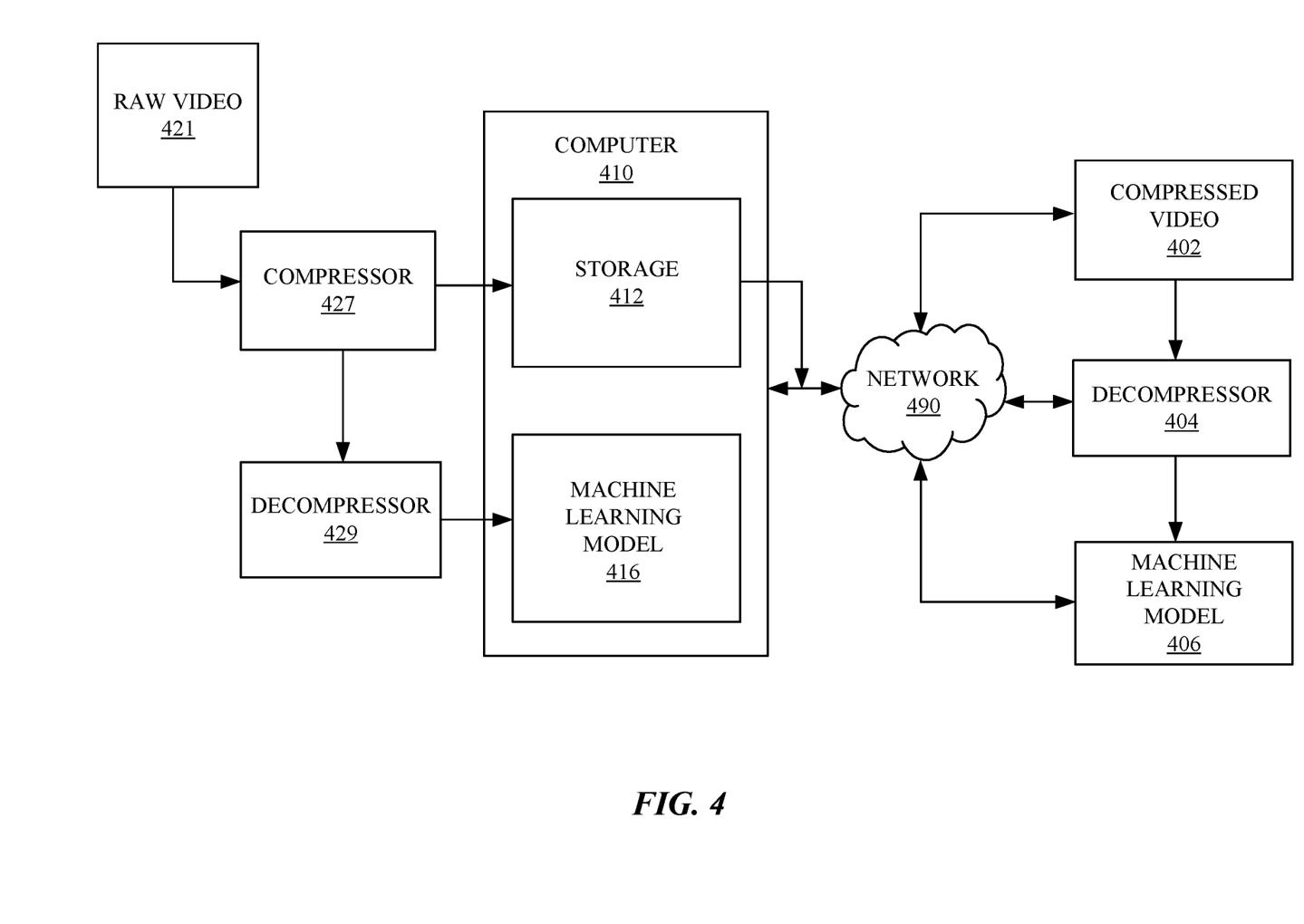
FIG. 4 illustrates an example block diagram showing the compression and decompression process of video as it is being captured, stored, used during machine-learning (ML) training, and used at inference time.

FIG. 4 illustrates an example block diagram showing the compression and decompression process of video as it is being captured, stored, used during ML training, and used at inference time. Since the raw video stream from the cameras in vehicle may be too large in size to be directly stored, the video needs to be compressed. The raw video 421 may be the raw video from cameras. The compressor 427 may receive the raw video 421 and compress it into a smaller size. The compressor 427 may send the compressed video to the computer 410 and the computer 410 may store the compressed video in the storage 412. The on-board ML model 416 may be in the GPUs of the computer 410. However, the training of the ML model may be offline and in a cloud. The computer 410 may upload the compressed video in this storage 412 to the cloud through the network connection 490, and therefore the cloud may store the compressed video 402. For the offline training of the ML model, the compressed video 402 may be decompressed and the decompressed images may be fed to the ML model 406 for training. The ML model 406, once trained, may be loaded onto each vehicle and stored as the local copy ML model 416. The computer 410 may synchronize with the cloud for exchanging data and parameters for the ML model 406, the decompressor 404, and the compressed video 402 both before and after the training. The parameters of the ML model 406 that is trained in the cloud may be synchronized to the ML model 416 in the computer 410.

At inference time, if the ML model 416 is fed by the raw video 421, the system may have inaccurate object detection and unpredictable response because the ML model is trained by the decompressed images instead of raw images. In particular embodiments, the ML model 416 may be fed with decompressed video rather than the raw video 421. For example, the decompressor 429 may receive the compressed video from the compressor 427 and decompress the compressed video into decompressed video. The decompressor 429 may send the decompressed video to the machine-learning model 416 at inference time. The compression process by the compressor 427 may take time and cause latency in the response process of the system. The decompression process by the decompressor 429 may also take time and cause additional latency in the response process of the system.

Figure 5:
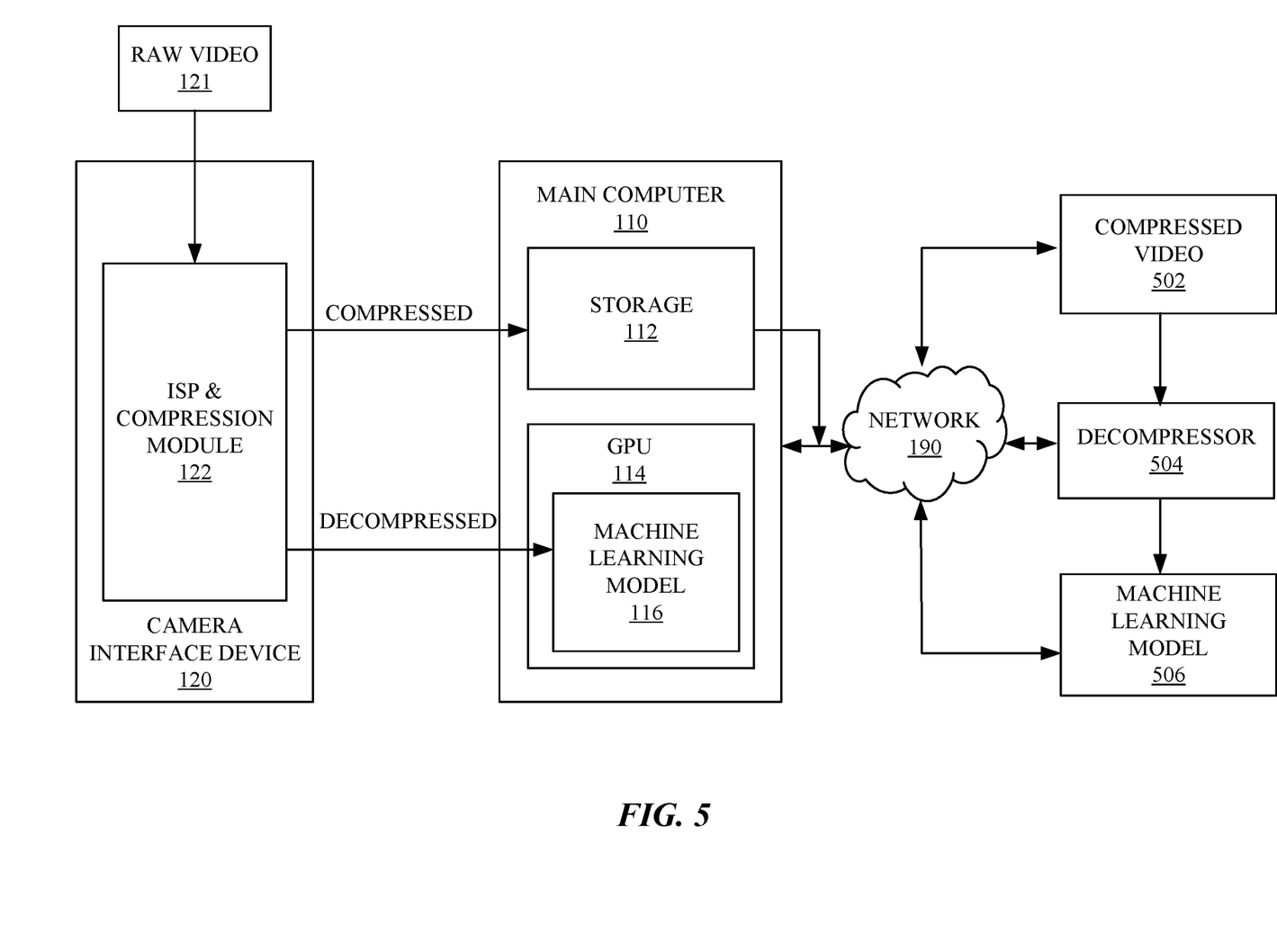
FIG. 5 illustrates an example block diagram showing the use of compression byproduct as the input for a machine-learning (ML) model at inference time.

FIG. 5 illustrates an example of a block diagram showing the use of a compression byproduct as the input for a ML model at inference time. In particular embodiments, the camera interface device 120 may receive the raw image 121 from the cameras of the system. The camera interface device 120 may include the ISP and compression module 122. The ISP and compression module 122 may take the raw image 121 as input and may compress the raw image 121 to a smaller size. In particular embodiments, the compression of the raw video may be according to the HEVC (H.265) standard. In particular embodiments, the ISP and compression module may include an ISP SoC as illustrated in FIG. 3. The compressed video may be sent to the computer 110 and the computer 110 may store the compressed video in its storage 112 (e.g., non-volatile storage). Because the compressed video may have a smaller size than the uncompressed video, the compressed video may need a smaller bandwidth and may be stored in the storage 112 with a reasonable size. In particular embodiments, the computer 110 may transmit the compressed video stored in the storage 112 to a second computing system (e.g., a server) which is configured to train the ML model hosted on the second computing system. The second computing system may decompress the compressed video to generate decompressed training video and train the ML model based on the decompressed training video. The ML model including related coefficients and parameters may be transmitted to the computer 110 after being trained on the second computing system.

In particular embodiments, the computer 110 may include one or more graphic processing units (GPUs) 114. In particular embodiments, the ML model 116 may be hosted by the one or more GPUs 114 of the computer 110. A ML model may have training time and inference time. At training time, the ML model may be trained using many input samples. At the inference time, the ML model may extract information from the images and make predictions, inferences, and decisions based on the images. In particular embodiments, the ML model may be a convolutional neural network (CNN). In particular embodiments, the ISP and compression module 122 may be optimized for the performance of the convolutional neural network (CNN). In particular embodiments, the convolutional neural network (CNN) for image processing may include a people detector which may detect people in the images and draw a box on the detected people in the images. In particular embodiments, the convolutional neural network (CNN) for image processing may include a key object detector which may detect key objects (e.g., a car or a pet) in the images and draw a box on the detected objects in the images. In particular embodiments, the convolutional neural network (CNN) may be trained offline in a cloud-based solution to learn how to detect people or key objects in the images. In particular embodiments, the computer 110 may synchronize with the cloud for uploading the compressed video in the storage 112 to the cloud through the network 190. The cloud may store the compressed video 502 and the ML model 506 which may be a mirrored copy of the ML model 116 for the offline training in the cloud. The decompressor 504 may decompress the compressed video 502 and send the decompressed video to train the ML model 506 in the cloud. In particular embodiments, the ML model, such as, the convolutional neural network (CNN) may be trained by millions of decompressed images. In particular embodiments, the training process of the ML model may involve human interaction and feedback for classifying the key objects in the images to train the ML model. In particular embodiments, the ML model may adapt itself to learn to predict, detect, or classify the objects of interest in the images. In particular embodiments, the ML model 506, which is trained in the cloud, may be downloaded to a local storage of the computer 110. In particular embodiments, the ML model 506 may be synchronized to the ML model 116 which is locally hosted by the computer 110. The ML model 116 in the GPUs 114 of the computer 110 may receive updated coefficients and parameters from the cloud and update itself according to the training results of the ML model 506 in the cloud.

In particular embodiments, at inference time, the ISP and compression module 122 may generate the decompressed video as a byproduct of the encoding process for compressing the video. In particular embodiments, the ISP and compression module 122 may generate the compressed video stream and the decompressed video stream at substantially the same time. The camera interface device 120 may send the decompressed video stream, which is generated as the byproduct of the compression process by the ISP and compression module 122, to the ML model 116. The ML model 116 may process and analyze the decompressed images in the decompressed video and may make decisions accordingly to guide the vehicle.

In particular embodiments, the ISP and compression module 122 may include a compressor with a compression algorithm. In particular embodiments, the compression algorithm may convert the original frame image to a discrete cosine transform (DCT) space (e.g., jpeg). The converted image may be in form of a finite sequence of data points in terms of a sum of cosine functions with different frequencies. In particular embodiments, the compression algorithm may encode the coefficients of the cosine functions to generate the compressed images. The compression algorithm may iteratively decompress the last compressed frame and compare the decompressed images to the original image. The compression algorithm may generate new compressed images by computing and minimizing the error between the original image and the decompressed image. In particular embodiments, the compression algorithm may generate the decompressed images essentially at the same time of the compressing process as a free byproduct with no requirement for additional processes, time, or resources. In particular embodiments, the decompressed images may be constantly available during the compressing process of the compression algorithm.

In particular embodiments, by feeding the decompressed video to the ML model 116 at inference time, the system may be more accurate in object detection and more predictable in response to the surrounding environment. As an example and not by way of limitation, a key object (e.g., a car, a human, or a pet) may be included in the pictures taken by the cameras. The key object image may have blur or noise after being compressed to smaller size by the ISP and compression module. The blur or noise may be generated during the compression process of the images. The decompressed images based on those compressed images may include similar blur or noise. Therefore, when the machine learning (ML) model is trained offline by the decompressed images based on the compressed images, the ML model may be trained with images having those blur and noise. At inference time, the raw video generated by the cameras of the vehicle in real-time may not have the blur or noise as the decompressed images. Therefore, feeding the ML model with raw video at inference time may put the ML model in situations that are different from how the ML model is trained. Consequently, the ML model may have less accurate object detection and more unpredictability in response to the surrounding environment of the vehicle. Feeding the ML model 116 with the decompressed images at inference time may put the ML model in the same situations under which it is trained, and therefore the system may have better accuracy and predictability. As another example and not by way of limitation, an object may show up as a few pixels on the images when the key object is relatively far away (e.g., 30 meters) from the cameras capturing the images. The object may be blurred into noise during the compressing process. During the offline training, the ML model may not see the object at all. At inference time, if the ML model is fed with raw video, the ML model may detect the object that is not visible during training and the system may not know how to respond accordingly. By feeding the ML model at inference time the decompressed images, the unpredictability may be eliminated.

In particular embodiments, by the method of using the byproduct decompressed images rather than generating decompressed images using a separate decompressing process, the system may avoid the latency caused by the separate decompressing process. In particular embodiments, the method may minimize the latency of the whole process and reduce the time budget for system to make decisions in response to the surrounding environment. As an example and not by way of limitation, the method may save tens of milliseconds time for the responding process. In particular embodiments, the frame time of the cameras may be 60 milliseconds. In particular embodiments, the method may save time in the order of 10 milliseconds for a total time budget of 100 milliseconds. In particular embodiments, the method may save 10% of the total time budget and may give more time to other processes such as image processing or decision making by the ML model.

Figure 6:
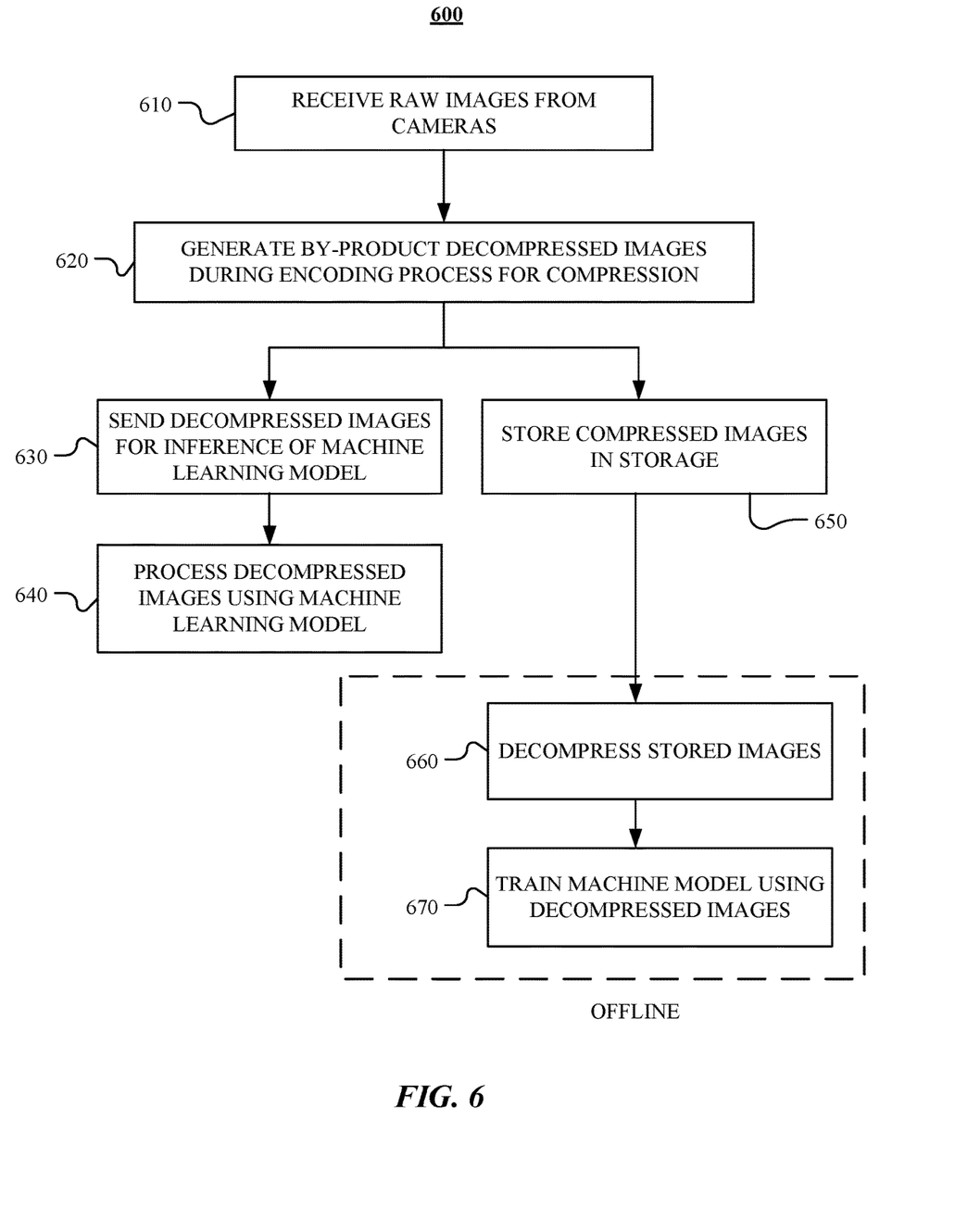
FIG. 6 illustrates an example method for using decompressed images byproduct as input to a machine-learning (ML) model at inference time.

FIG. 6 illustrates an example method for using decompressed images byproduct as input to a ML model at inference time. In step 610, the system may receive raw video streams from the cameras of the vehicle. The raw video streams may include a number of raw images from the cameras of the vehicle. The raw video streams may be received at one or more camera interface devices of the system through the coax serial links to the cameras. In particular embodiments, two video streams from two cameras within a camera pair may be interleaved to generate one video stream and the interleaved video stream may be transmitted through the MIPI interface links. In step 620, the system may generate a decompressed video stream, composed of a number of decompressed images, as the byproduct of the encoding process for compressing the video stream. In particular embodiments, the system may compress the uncompressed video stream into smaller size using compression algorithms. The compressed video having smaller size may need less storage space for recording. In particular embodiments, the compression process may be performed by the camera interface devices connecting the cameras and the computer.

In particular embodiments, the system may generate the compressed and decompressed video essentially at the same time in step 620 using a compression algorithm. In particular embodiments, the compression algorithm may convert the original frame image to a discrete cosine transform (DCT) space. In particular embodiments, the compression algorithm may encode the coefficients of the cosine functions to generate the compressed images. The compression algorithm may decompress the last compressed frame and compute the error between the decompressed images and the original image. The compression algorithm may generate new compressed images by minimizing the error between the decompressed image and the original image. In particular embodiments, the compression algorithm may generate the decompressed images essentially at the same time of the compressing process as a free byproduct with no requirement for additional processes, time, or resources. In particular embodiments, the decompressed images may be constantly available during the compressing process of the compression algorithm.

In step 630, the system may send the decompressed images to the ML model at inference time. In particular embodiments, the ML model may be a convolutional neural network (CNN) hosted by the GPUs of the computer. In step 640, the system may process the decompressed images using the ML model and make predictions and decisions to guide the vehicle. The ML model may generate one or more outputs (e.g., inference, predictions, decisions) based on the decompressed images and provide instructions based on the outputs for navigating the vehicle. In step 650, the system may send the compressed images in the compressed video to the computer for storage purposes. The computer may store the compressed video in its storage and the compressed video may be used for offline training of the ML model. In particular embodiments, the offline training of the ML model may be in a cloud. The system may synchronize the compressed images and the ML model parameter with the cloud. In step 660, the compressed images may be decompressed in the cloud. In step 670, the decompressed image may be used to train the ML model in the cloud. In particular embodiments, the parameters of the training results of the ML model will be synchronized to the computer local ML model. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for using compression byproduct as input to a ML model at inference time including the particular steps of the method of FIG. 6, this disclosure contemplates any suitable method for using compression byproduct as input to a ML model at inference time including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
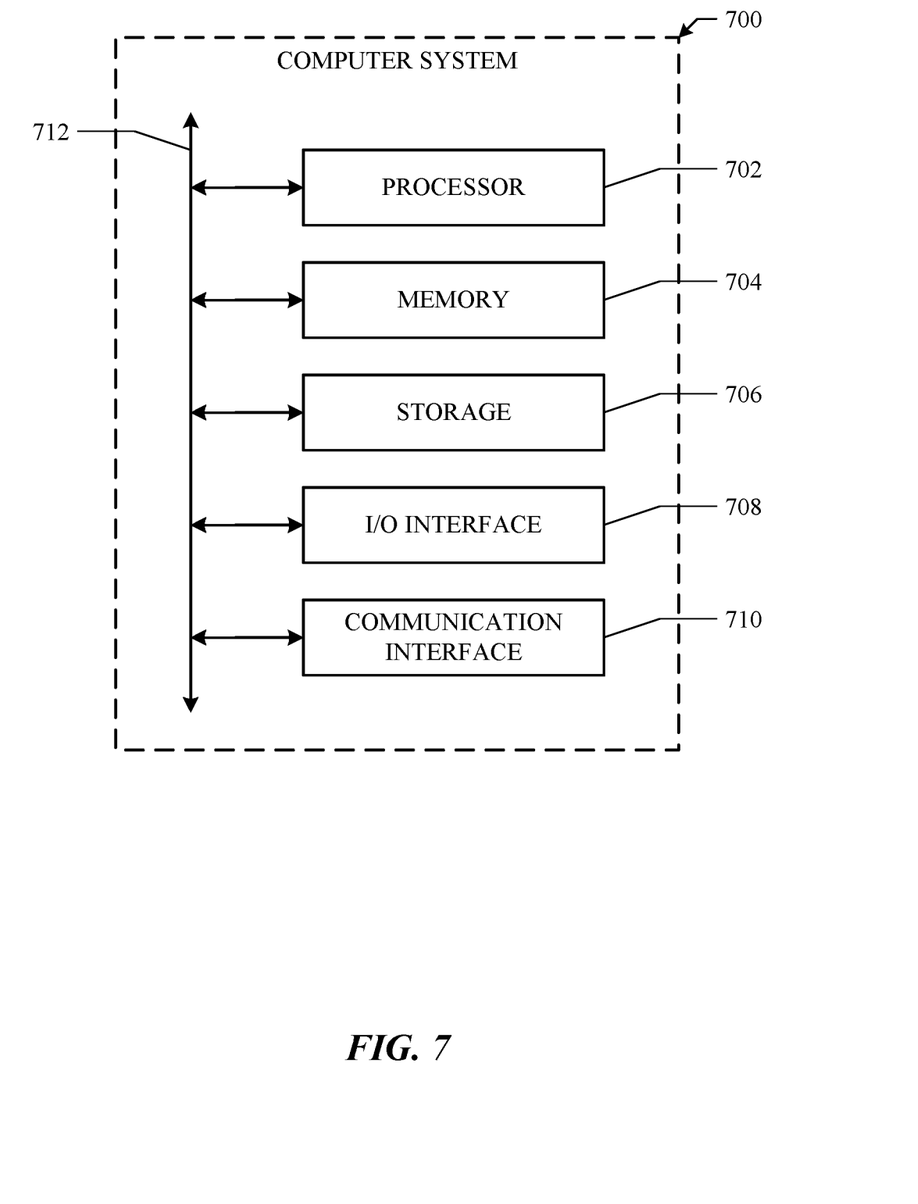
FIG. 7 illustrates an example of a computing system.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   performing compression on a raw image from an image sensor to generate a compressed image, wherein a decompressed image is generated as a byproduct of the compression;
   sending the decompressed image to a machine-learning model that trains using decompressed images generated by the compression; and providing operational instructions to a vehicle utilizing an output having information generated by the machine-learning model.

2. The method of claim 1, further comprising:
storing the compressed image in non-volatile storage of a first computing system; and
transmitting the compressed image to a second computing system, wherein the second computing system is configured to train the machine-learning model.

3. The method of claim 2, wherein the second computing system generates a decompressed training image by decompressing the compressed image, and wherein the machine-learning model is trained based on the decompressed training image.

4. The method of claim 2, wherein the machine-learning model is transmitted to the first computing system after being trained on the second computing system.

5. The method of claim 1, wherein the machine-learning model is trained in a cloud, and wherein the machine-learning model is downloaded onto a first computing system from the cloud after being trained.

6. The method of claim 5, wherein the machine-learning model receives one or more coefficients synchronized from the cloud after the machine-learning model is downloaded onto the first computing system.

7. The method of claim 1, wherein the output comprises one or more objects detected from the decompressed image by the machine-learning model.

8. The method of claim 1, wherein the output comprises a prediction about an environment surrounding the vehicle, and wherein the operational instructions are based on the prediction.

9. The method of claim 8, wherein the prediction is generated by the machine-learning model, and wherein the machine-learning model is locally hosted by a first computing system.

10. The method of claim 1, wherein the output comprises a decision for navigating the vehicle, and wherein the operational instructions are based on the decision.

11. The method of claim 1, wherein the decompressed image is different from the raw image.

12. The method of claim 1, wherein the decompressed image comprises blurs or noises generated during the compression.

13. A non-transitory computer-readable storage media embodying software that is operable when executed by a first computing system to:
receive an uncompressed image from a camera;
generate a compressed image by performing compression on the uncompressed image, wherein a decompressed image is generated as a byproduct during the compression;
send the decompressed image to a machine-learning model trained using decompressed images; and
generate, by the machine-learning model, an output based on the decompressed image; and
provide operational instructions to a vehicle based on the output.

14. The non-transitory computer-readable storage media of claim 13 embodying software that is further operable when executed by the first computing system to:
store the compressed image in a non-volatile storage of the first computing system; and
transmit the compressed image to a second computing system, wherein the second computing system is configured to train the machine-learning model.

15. The non-transitory computer-readable storage media of claim 14, wherein the second computing system generates a decompressed training image by decompressing the compressed image, and wherein the machine-learning model is trained based on the decompressed training image.

16. The non-transitory computer-readable storage media of claim 13, wherein the machine-learning model is transmitted to the first computing system after being trained on a second computing system.

17. A computing system comprising:
a non-transitory computer-readable storage media embodying instructions; and
a processor coupled to the non-transitory computer-readable storage media and operable to execute the instructions to:
perform compression on a raw image from an image sensor to generate a compressed image, wherein a decompressed image is generated as a byproduct of the compression;
send the decompressed image to a machine-learning model that trains using decompressed images generated by the compression; and
provide operational instructions to a vehicle utilizing an output having information generated by the machine-learning model.

18. The computing system of claim 17, wherein the raw image, the compressed image, and the decompressed image represent an environment of the vehicle at a particular time.

19. The computing system of claim 18, wherein the compression generates the compressed image and the decompressed image at a same time.

20. The computing system of claim 17, wherein the processor is coupled to the non-transitory computer-readable storage media and is operable to execute the instructions further to:
compute an error between the decompressed image and the raw image; and
generate a new compressed image based upon the error.

* * * * *